(12) United States Patent
Chen

(10) Patent No.: US 9,335,609 B2
(45) Date of Patent: May 10, 2016

(54) DRIVING SYSTEM FOR SHAPE MEMORY ALLOY BASED ACTUATOR AND CAMERA MODULE USING SAME

(71) Applicant: HON HAI PRECISION INDUSTRY CO., LTD., New Taipei (TW)

(72) Inventor: Yu-Han Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/555,659

(22) Filed: Nov. 27, 2014

(65) Prior Publication Data

US 2015/0153630 A1    Jun. 4, 2015

(30) Foreign Application Priority Data

Nov. 30, 2013  (CN) .......................... 2013 1 0622120

(51) Int. Cl.
| | | |
|---|---|---|
| *H04N 5/232* | (2006.01) | |
| *G03B 13/00* | (2006.01) | |
| *G03B 13/36* | (2006.01) | |
| *G02B 7/08* | (2006.01) | |

(52) U.S. Cl.
CPC . *G03B 13/36* (2013.01); *G02B 7/08* (2013.01)

(58) Field of Classification Search
CPC .................................. G03B 13/36; G02B 7/08
USPC ............ 348/345, 335; 359/822, 823; 396/133
See application file for complete search history.

(56) References Cited

U.S. PATENT DOCUMENTS

| | | | | |
|---|---|---|---|---|
| 8,174,608 | B2* | 5/2012 | Hara ........................ | G02B 7/08 310/307 |
| 2007/0280668 | A1* | 12/2007 | Kubo ....................... | G02B 7/04 396/133 |
| 2011/0255184 | A1* | 10/2011 | Topliss .................... | F03G 7/065 359/823 |
| 2015/0135703 | A1* | 5/2015 | Eddington .............. | F03G 7/065 60/528 |

\* cited by examiner

*Primary Examiner* — Tuan Ho
*Assistant Examiner* — Zhenzhen Wu
(74) *Attorney, Agent, or Firm* — Novak Druce Connolly Bove + Quigg LLP

(57) ABSTRACT

A driving system for an SMA based actuator having SMA wires or rods includes a capture module, a determination module, and four drive modules. The capture module captures current position of a lens module from a position sensor. The displacement difference between the current position and a target position is determined. The first drive module can rapidly or slowly increase the current to the SMA, or rapidly or slowly decrease the current to the SMA, causing fast or slow movement of a lens module in one direction or fast or slow movement in the opposite direction, to achieve the desired auto-focus of a camera module.

11 Claims, 2 Drawing Sheets

DRIVING SYSTEM FOR SHAPE MEMORY ALLOY BASED ACTUATOR AND CAMERA MODULE USING SAME

FIELD

The subject matter herein generally relates to shape-memory alloys and functions thereof.

BACKGROUND

With ongoing developments in microcircuitry and multimedia technology, camera modules have become widely used in a variety of consumer electronic devices, such as smart phones, notebook computers, digital cameras, and personal digital assistants (PDAs). A typical camera module includes at least one lens module and an image sensor. In addition, there is a growing demand for developing more camera modules with multiple functions, such as camera modules having auto-focus function. A shape memory alloy (SMA) based actuator utilizing shape-memory alloy is widely used in a camera module to achieve the auto-focus function.

BRIEF DESCRIPTION OF THE DRAWINGS

Implementations of the present technology will now be described, by way of example only, with reference to the attached figures.

DETAILED DESCRIPTION

Figure 1:
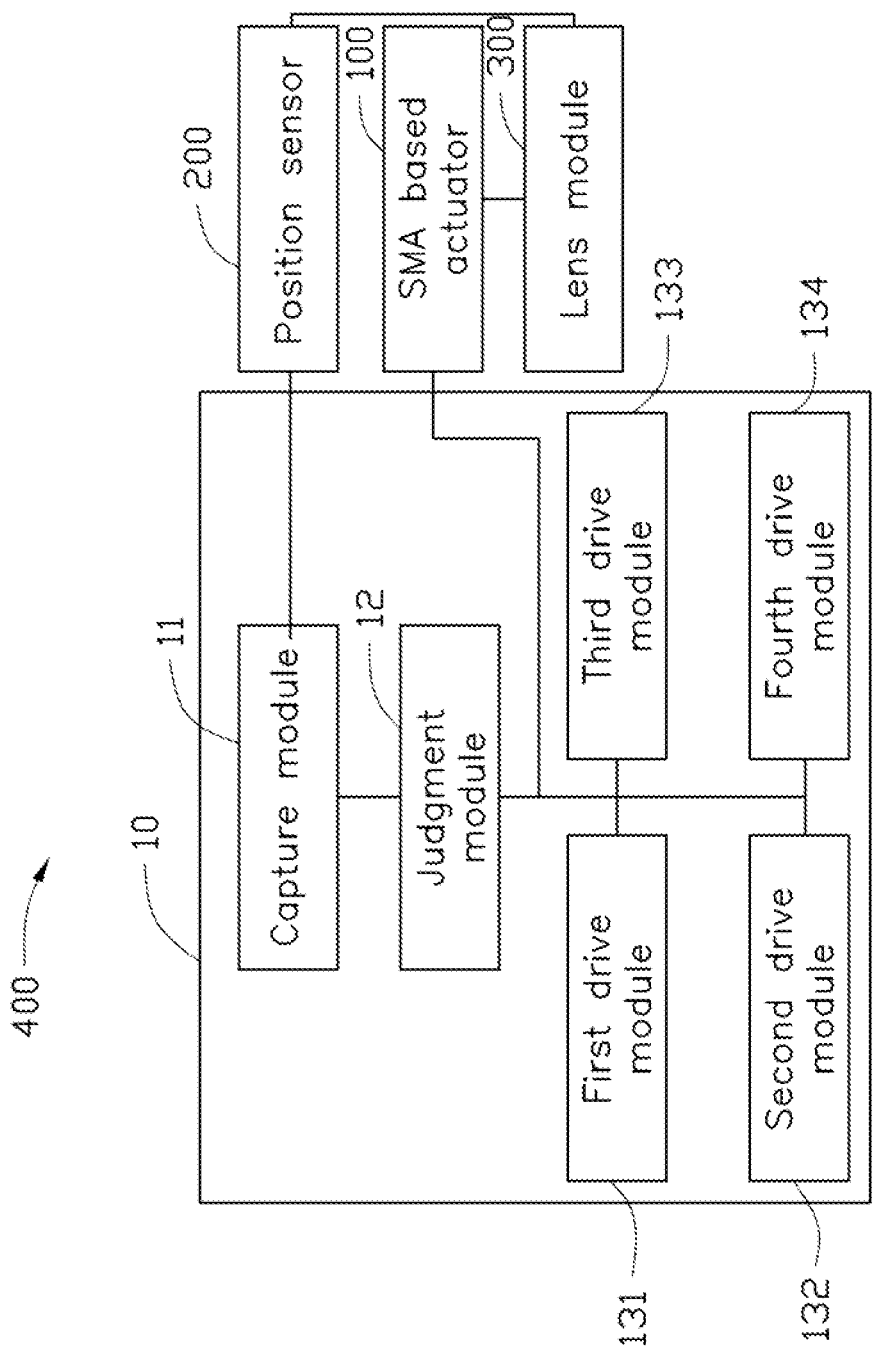
FIG. 1 is a block diagram of an example embodiment of a camera module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," means "including, but not necessarily limited to" and specifically indicates open-ended inclusion or membership in the so-described combination, group, series and the like. The references "a plurality of" and "a number of" mean "at least two."

The present disclosure is described in relation to a driving system for an SMA based actuator. The SMA based actuator utilizes wires or rods made of SMA (hereafter "SMA wires"). The driving system includes a capture module, a determination module, a first drive module, a second drive module, a third drive module, and a fourth drive module. The capture module is configured to capture current position of a lens module from a position sensor. The determination module is configured to calculate difference $P_0$ between the current position and a target position and to determine which range out of a plurality of ranges the difference $P_0$ may fall into. The first drive module is configured to rapidly increase the current applied to the SMA wires to contract the SMA wires to move the lens module towards the target position when $P_0 \geq 20 \mu m$. The second drive module is configured to rapidly decrease the current applied to extend the SMA wires to move the lens module to the target position when $P_0 \leq -20 \mu m$. The third drive module is configured to slowly increase the current applied to the SMA wires to contract the SMA wires to move the lens module to the target position when $0 < P_0 < 20 \mu m$. The fourth drive module is configured to slowly decrease the current applied to the SMA wires to slowly extend the SMA wires to move the lens module to the target position when $-20 \mu m < P_0 < 0$.

The present disclosure is described in relation to a camera module. The camera module includes a lens module, a position sensor, an SMA based actuator, and a driving system. The position sensor is configured to detect the position of lens module. The SMA based actuator utilizes SMA wires and is configured to move the lens module along an optical axis from an initial position to a target position to achieve auto-focus function. The driving system includes a capture module, a determination module, a first drive module, a second drive module, a third drive module, and a fourth drive module. The capture module is configured to capture current position of the lens module from the position sensor. The determination module is configured to calculate difference $P_0$ between the current position and the target position and to determine which range out of a plurality of ranges the difference $P_0$ may fall into. The first drive module is configured to rapidly increase the current applied to the SMA wires to contract the SMA wires to move the lens module towards the target position when $P_0 \geq 20 \mu m$. The second drive module is configured to rapidly decrease the current applied to the SMA wires to extend the SMA wires to move the lens module to the target position when $P_0 \leq -20 \mu m$. The third drive module is configured to slowly increase the current applied to the SMA wires to contract the SMA wires to move the lens module to the target position when $0 < P_0 < 20 \mu m$. The fourth drive module is configured to slowly decrease the current applied to the SMA wires to slowly extend the SMA wires to move the lens module to the target position when $-20 \mu m < P_0 < 0$.

FIG. 1 illustrates an example embodiment of a camera module 400. The camera module 400 can include an SMA based actuator 100, a position sensor 200, a lens module 300, and a driving system 10.

A plurality of lenses (not shown) are received in the lens module 300. The SMA based actuator 100 is configured to move the lens module 300 along an optical axis in the camera module 400 from an initial or current position to a target position, so achieving the auto-focus function. The position sensor 200 is configured to detect the position of lens module 300. In this embodiment, the position sensor 200 is a Hall sensor. The SMA based actuator 100 includes SMA wires. When a current to the SMA wires is increased, the SMA wires are heated and contract, and the contracted SMA wires move the lens module 300 along the optical axis to the target position. When the current to the SMA wires is decreased, the SMA wires cool and extend, and the extended SMA wires move the lens module 300 along the optical axis to the target position. The driving system 10 is configured to drive the SMA based actuator 100 to move the lens module 300.

The driving system 10 can include a capture module 11, a determination module 12, a first drive module 131, a second drive module 132, a third drive module 133, and a fourth drive module 134.

The capture module 11 is configured to capture the current position of the lens module 300 from the position sensor 200. The determination module 12 is configured to calculate the difference $P_0$ between the current position and the target position, to determine which range out of a number of ranges that the difference $P_0$ may fall into, and to activate the corresponding drive module 131, 132, 133, or 134, to drive the SMA based actuator 100 to move the lens module 300. When the difference $P_0$ is a positive number, it represents that the current position of the lens module 300 exceeds the target position of the lens module 300, and the SMA wires should be shorten to move the lens module 300 along the optical axis to the target position. When the difference $P_0$ is a negative number, it represents that the current position of the lens module 300 does not reach the target position of the lens module 300, and the SMA wires should be lengthened to move the lens module 300 along the optical axis to the target position. The ranges are stored in the determination module 12 and include the following formulas: $P_0 \geq 20 \mu m$, $P_0 \leq -20 \mu m$, $0 < P_0 < 20 \mu m$, $-20 \mu m < P_0 < 0$, and $-5 \mu m < P_0 < 0$. In this embodiment, the capture module 11 can be a Bluetooth drive or a WIFI drive which can capture data from external devices. The determination module 12 can be a central processing unit (CPU) which can execute calculation and comparison. The four drive modules 131, 132, 133, and 134 can be triggers.

The first drive module 131 is configured to rapidly increase the current applied to the SMA wires, by 10 mA per second, to rapidly contract the SMA wires to move the lens module 300 to the target position, when the difference $P_0$ exceeds or is equal to 20 micrometers ($P_0 \geq 20 \mu m$).

The second drive module 132 is configured to rapidly decrease the current applied to the SMA wires, by 10 mA per second, to rapidly extend the SMA wires to move the lens module 300 to the target position, when the difference $P_0$ is less than or is equal to −20 micrometers ($P_0 \leq -20 \mu m$). "Rapidly" means increasing the current by over 10 mA per second or decreasing the current by over 10 mA per second.

The third drive module 133 is configured to slowly increase the current applied to the SMA wires, by 2~4 mA per second, to slowly contract the SMA wires to move the lens module 300 to the target position, when the difference $P_0$ is less than 20 micrometers and more than 0 micrometer ($0 < P_0 < 20 \mu m$).

The fourth drive module 134 is configured to slowly decrease the current applied to the SMA wires, by 2~4 mA per second, to slowly extend the SMA wires to move the lens module 300 to the target position, when the difference $P_0$ is more than −20 micrometers and less than 0 micrometer ($-20 \mu m < P_0 < 0$). "Slowly" means increasing the current by 2~4 mA per second or decreasing the current by 2~4 mA per second.

Figure 2:
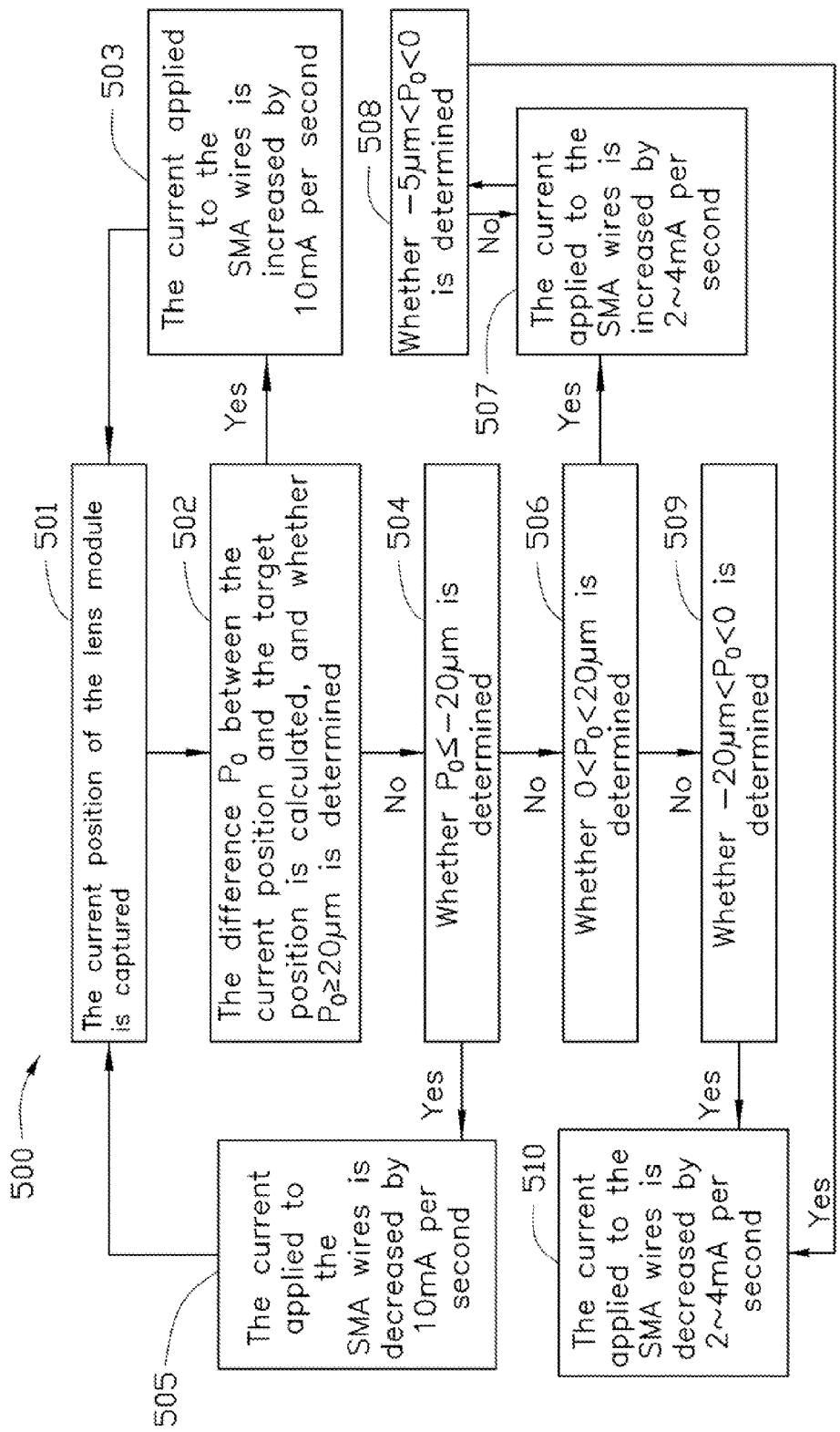
FIG. 2 is a flowchart showing an auto-focus method of the camera module.

FIG. 2 shows a flowchart illustrating an auto-focus method 500 of the camera module 400. The auto-focus method 500 is provided by way of an example, as there are a variety of ways to carry out the method. The auto-focus method 500 described below can be carried out using the configurations illustrated in FIG. 1, for example, and various elements of these figures are referenced in explaining auto-focus method 500. Each block shown in FIG. 2 represents one or more processes, methods, or subroutines, carried out in the auto-focus method 500. Additionally, the illustrated order of blocks is by example only and the order of the blocks can change. The auto-focus method 500 can begin at block 502.

At block 501, the current position of the lens module 300 is captured from the position sensor 200. Block 501 is executed by the capture module 11.

At block 502, the difference $P_0$ between the current position and the target position is calculated, and whether $P_0 \geq 20$ μm is determined. If $P_0 \geq 20$ μm, the method proceeds to block 503. If not, the method proceeds to block 504. Block 502 is executed by the determination module 12.

At block 503, the current applied to the SMA wires is increased by 10 mA per second, causing the SMA wires to rapidly contract to move the lens module 300 to the target position. Block 503 is executed by the first drive module 131. As block 503 is executed, blocks 501 and 502 are continuously executed.

At block 504, whether $P_0 \leq 20$ μm is determined. If $P_0 \leq 20$ μm, the method proceeds to block 505. If not, the method proceeds to block 506. Block 504 is executed by the determination module 12.

At block 505, the current applied to the SMA wires is decreased by 10 mA per second, causing the SMA wires to rapidly extend to move the lens module 300 to the target position. Block 505 is executed by the second drive module 132. As block 505 is executed, blocks 501 and 502 are continuously executed.

At block 506, whether $0 < P_0 < 20$ μm is determined. If $0 < P_0 < 20$ μm, the method proceeds to block 507. If not, the method proceeds to block 509. Block 506 is executed by the determination module 12.

At block 507, the current applied to the SMA wires is slowly increased by 2~4 mA per second, causing the SMA wires to slowly contract to move the lens module 300 to the target position. Block 507 is executed by the third drive module 133. As block 507 is executed, block 508 is also executed.

At block 508, whether $-5 \mu m < P_0 < 0$ is determined. If $-5 \mu m < P_0 < 0$, the method proceeds to block 510. If not, the method reverts to block 507. Block 508 is executed by the determination module 12.

At block 509, whether $-20 \mu m < P_0 < 0$ is determined. If $-20 \mu m < P_0 < 0$, the method proceeds to block 510. Block 509 is executed by the determination module 12.

At block 510, the current applied to the SMA wires is slowly decreased by 2~4 mA per second, causing the SMA wires to slowly extend to move the lens module 300 to the target position. Block 510 is executed by the fourth drive module 134.

The embodiments shown and described above are only examples. Many details are often found in the art such as the other features of a driving system for a shape memory alloy based actuator and a camera module using the driving system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A driving system for a shape memory alloy (SMA) based actuator having SMA wires, comprising:
   a capture module configured to capture a current position of a lens module from a position sensor;
   a determination module configured to calculate difference $P_0$ between the current position and a target position and to determine which range out of a plurality of ranges the difference $P_0$ may fall into;

a first drive module configured to rapidly increase the current applied to the SMA wires to rapidly contract the SMA wires to move the lens module to the target position when $P_0 \geq 20$ μm;

a second drive module configured to rapidly decrease the current applied to the SMA wires to rapidly extend the SMA wires to move the lens module to the target position when $P_0 \leq 20$ μm;

a third drive module configured to slowly increase the current applied to the SMA wires to slowly contract the SMA wires to move the lens module to the target position when $0 < P_0 < 20$ μm; and a fourth drive module configured to slowly decrease the current applied to the SMA wires to slowly extend the SMA wires to move the lens module to the target position when $-20$ μm $< P_0 < 0$.

2. The driving system of claim 1, wherein the first drive module is configured to increase the current applied to the SMA wires by 10 mA per second.

3. The driving system of claim 1, wherein the second drive module is configured to decrease the current applied to the SMA wires by 10 mA per second.

4. The driving system of claim 1, wherein the third drive module is configured to increase the current applied to the SMA wires by 2~4 mA per second.

5. The driving system of claim 1, wherein the fourth drive module is configured to decrease the current applied to the SMA wires by 2~4 mA per second.

6. A camera module comprising:
a lens module;
a position sensor configured to detect the position of lens module;
a SMA based actuator having SMA wires and configured to move the lens module along an optical axis from an initial position to a target position to achieve auto-focus function; and
a driving system comprising:
a capture module configured to capture current position of the lens module from the position sensor;
a determination module configured to calculate difference $P_0$ between the current position and the target position and to determine which range out of a plurality of ranges the difference $P_0$ may fall into;
a first drive module configured to rapidly increase the current applied to the SMA wires to rapidly contract the SMA wires to move the lens module to the target position when $P_0 \geq 20$ μm;
a second drive module configured to rapidly decrease the current applied to the SMA wires to rapidly extend the SMA wires to move the lens module to the target position when $P_0 \leq -20$ μm;
a third drive module configured to slowly increase the current applied to the SMA wires to slowly contract the SMA wires to move the lens module to the target position when $0 < P_0 < 20$ μm; and
a fourth drive module configured to slowly decrease the current applied to the SMA wires to slowly extend the SMA wires to move the lens module to the target position when $-20$ μm $< P_0 < 0$.

7. The camera module of claim 6, wherein the first drive module is configured to increase the current applied to the SMA wires by 10 mA per second.

8. The camera module of claim 6, wherein the second drive module is configured to decrease the current applied to the SMA wires by 10 mA per second.

9. The camera module of claim 6, wherein the third drive module is configured to increase the current applied to the SMA wires by 2~4 mA per second.

10. The camera module of claim 6, wherein the fourth drive module is configured to decrease the current applied to the SMA wires by 2~4 mA per second.

11. The camera module of claim 6, wherein the position sensor is a Hall sensor.

* * * * *